Nov. 29, 1927.   1,650,629
R. W. JOHNSON
AUTOMATIC TAKE-UP FOR SHAFT BEARINGS
Filed June 9, 1925
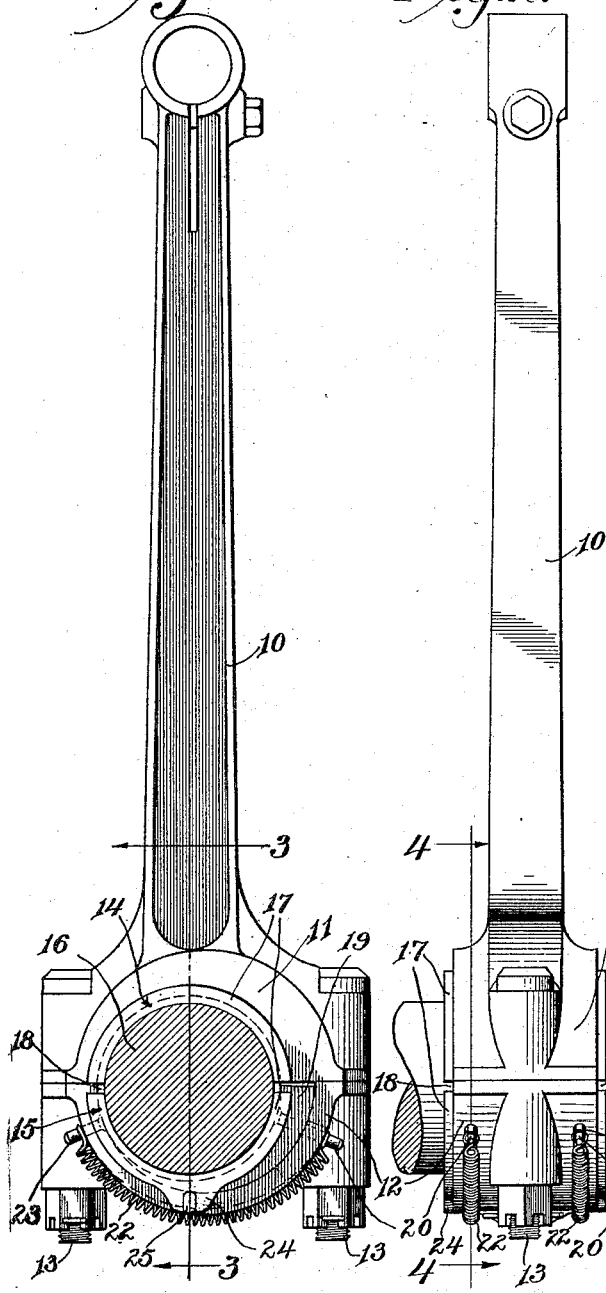
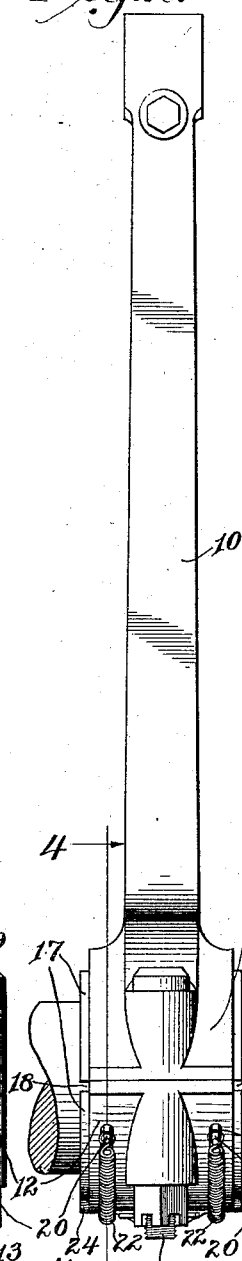
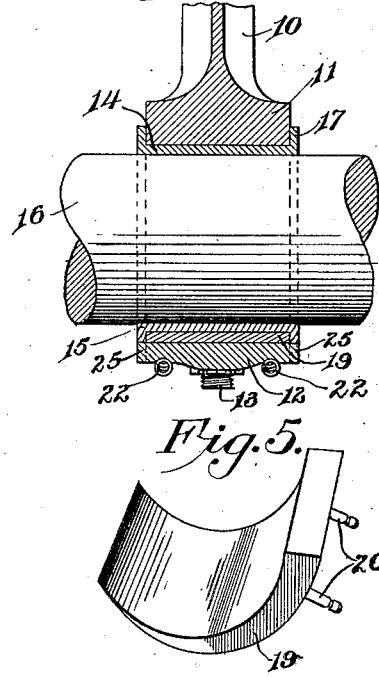
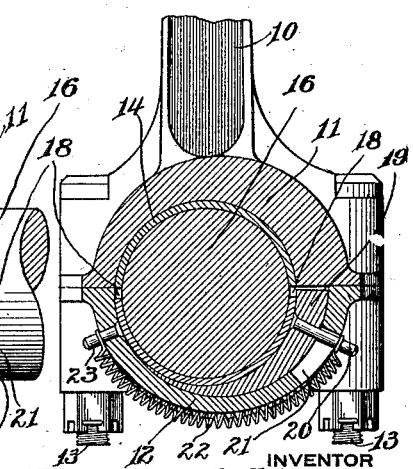
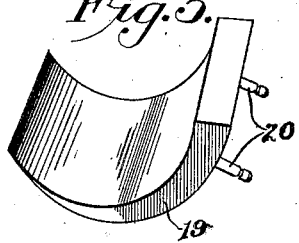
INVENTOR
Richard W. Johnson
BY
ATTORNEY
WITNESSES
Chas. L. McDonald
E. N. Lovewell Patented Nov. 29, 1927.

1,650,629

UNITED STATES PATENT OFFICE.

RICHARD W. JOHNSON, OF DANVILLE, PENNSYLVANIA, ASSIGNOR OF ONE-FOURTH TO CHARLES W. JOHNSON, OF DANVILLE, PENNSYLVANIA.

AUTOMATIC TAKE-UP FOR SHAFT BEARINGS.

Application filed June 9, 1925. Serial No. 35,999.

This invention relates to an automatic take-up, especially designed with reference to the connecting rod bearings on an automobile motor. The same principle may be used to advantage, however, in connection with the main bearings of the motor, and, in fact, with any shaft bearings where smooth and uniform operation is essential.

In motors, as at present constructed, as soon as the connecting rod bearings become worn, a knock develops which rapidly becomes worse unless the bearings are taken up, and in order to do this it is necessary to take down the motor, or nearly so. Nothing is more annoying to the motorist than a knock in the motor, nothing occurs more frequently, nothing demands more prompt attention, and no repair job is more expensive than its elimination. What has been said of connecting rod bearings can also be said of the main bearings of a motor, or any other high duty bearings.

With the above facts in mind, the general object of the present invention is to provide an improved take-up device, which will take care of itself during the entire life of the motor, and will always keep the bearings properly adjusted.

A further and more specific object of the invention is to provide an eccentric arcuate wedge, outside of and independent of the bearing elements, and automatically adjustable circumferentially thereof by means of springs, which are under constant tension, whereby the bearing is maintained in the same relative position during its life without any tendency to become tighter, or to grip the shaft as the latter is rotated in either direction.

The invention consists further in certain specific features of construction and combinations of elements, the advantages of which will be more fully explained in connection with the accompanying drawing illustrating one embodiment thereof.

In the drawing:

Figure 1 is a side elevation of a connecting rod with the invention applied thereto.

Figure 2 is a side elevation of the same taken at right angles to Figure 1.

Figure 3 is a sectional view taken on the line 3—3 of Figure 1.

Figure 4 is a sectional view taken on the line 4—4 of Figure 2.

Figure 5 is a perspective view of the arcuate automatically adjustable wedge.

The invention is shown as applied to a connecting rod 10, having a bearing box 11 formed at one end to which a cap 12 is secured by means of bolts 13. A bushing or lining composed of brass, or other suitable metal, is mounted within the bearing box, and consists of two approximately semi-cylindrical sections 14 and 15 in which the crank portion of the shaft 16 is rotatably held. The sections 14 and 15 are formed with peripheral flanges 17 at their ends, whereby they are held against longitudinal movement in the bearing box. The edges of these sections are separated by small spaces 18, so as to allow the same to be taken up to compensate for wear.

One side of the box 11 is thicker than the other, and the box is so disposed that the center line of the shaft 16 is substantially in the same plane as the central longitudinal line of the connecting rod 10. The cap 12 is substantially of uniform thickness, with its outer surface forming a continuation of the cylindrical outer surface of the box 11. This leaves an arcuate wedge-shaped space between the cap 12 and the section 15 of the bushing, within which is mounted a correspondingly shaped wedge 19. This wedge is held between the flanges 17 of the section 15, and has a plurality of pins 20 secured therein, which project outwardly through slots 21 formed in the cap 12. Coiled springs 22 are stretched about the outer face of the cap 12, and are attached at one end to the projecting ends of the pins 20, and attached at the other end to pins 23 secured in the cap 12 at the opposite side of the bearing. The flanges 17, on the section 15, are formed with slotted ears 24, which receive lugs 25 formed on the cap 12, and positively prevent circumferential movement of the section 15 when the shaft 16 is rotated in its bearings.

When the device is first assembled, the take-up wedge 19 substantially fills the space between the section 15 and the cap 12, leaving only a slight play between the larger end of the wedge and the adjacent edge of the box 11. The tension of the springs 22 automatically draws the wedge in the direction of its sharp edge, and takes up whatever looseness there might otherwise be between the shaft 16 and the bushing sections 14 and 15. The tension of the springs 22 is so determined that a close fitting bearing is obtained without too much friction.

It has been hitherto proposed to provide an automatic take-up wedge which forms a part of the bearing for the shaft, but this has always caused difficulty because the frictional contact between the rotating shaft and wedge has a tendency to loosen the bearings when the shaft is rotated in one direction, and to cause the wedge to become too tight when the shaft is reversed. This variation in the position of the wedge, of course, becomes more pronounced as the speed increases. In the present construction, however, the section 15 is positively held against circumferential movement with the shaft, and the wedge is entirely out of contact with the shaft, so that there is no variation in the tension of the bearings, and its action is constant and uniform regardless of the speed or direction of rotation of the shaft.

It is also to be observed that the present invention is so designed that all parts thereof may be easily manufactured without departing from established shop practices. If one of the springs 22 should break, the other spring will be sufficient to prevent any serious results until the broken spring is replaced, which may be done in a moment's time without disturbing the bearings. As the bearings become worn, they will be automatically taken up, and the take-up device will last during the entire life of the car.

While I have shown and described the invention as applied to a connecting rod bearing, it is obvious that the same principle may be used in connection with other shaft bearings wherever desired. Various modifications may also be made in the form or design of the various parts without any material departure from the essential features of the invention. It is my purpose, therefore, to include all such modifications within the scope of the appended claim.

What is claimed is:

A shaft bearing comprising, in combination, a bearing box including a cap portion; a pair of bushing sections mounted within said box; one section being movable toward the other to compensate for wear; an arcuate wedge guided for circumferential movement between said cap portion and the adjacent bushing section; outwardly projecting pins secured to said wedge near its larger end; said cap portion having circumferential slots through which said pins project; pins secured to the cap portion near the smaller end of the wedge; a pair of tension springs stretched between the last-mentioned pins and the first-mentioned pins, whereby to urge said wedge constantly in a direction to take up the bearings; and means to hold one of said bushing sections against circumferential movement.

In testimony that I claim the foregoing as my own, I have hereto affixed my signature.

RICHARD W. JOHNSON.